United States Patent
Nagatani et al.

(10) Patent No.: US 12,512,773 B2
(45) Date of Patent: Dec. 30, 2025

(54) POSITIONING DEVICE AND CONTROL METHOD THEREOF

(71) Applicant: IMASEN ELECTRIC INDUSTRIAL CO., LTD., Aichi (JP)

(72) Inventors: Kentaro Nagatani, Aichi (JP); Koichi Yamanoue, Aichi (JP)

(73) Assignee: IMASEN ELECTRIC INDUSTRIAL CO., LTD., Aichi (JP)

(*) Notice: Subject to any disclaimer, the term of this patent is extended or adjusted under 35 U.S.C. 154(b) by 159 days.

(21) Appl. No.: 18/568,714

(22) PCT Filed: Jun. 14, 2022

(86) PCT No.: PCT/JP2022/023809
§ 371 (c)(1),
(2) Date: Dec. 8, 2023

(87) PCT Pub. No.: WO2023/286511
PCT Pub. Date: Jan. 19, 2023

(65) Prior Publication Data
US 2024/0275315 A1    Aug. 15, 2024

(30) Foreign Application Priority Data
Jul. 13, 2021    (JP) .................................. 2021-115632

(51) Int. Cl.
*H02P 6/24*    (2006.01)
*B60N 2/02*    (2006.01)
(Continued)

(52) U.S. Cl.
CPC ............ *H02P 6/24* (2013.01); *B60N 2/02253* (2023.08); *B62D 1/181* (2013.01); *H02K 7/1166* (2013.01); *H02K 11/215* (2016.01)

(58) Field of Classification Search
CPC .... H02P 6/24; H02P 29/60; H02P 7/04; H02P 3/12; B60N 2/02253; B62D 1/181; H02K 7/1166; H02K 11/215
(Continued)

(56) References Cited

U.S. PATENT DOCUMENTS

| | | | |
|---|---|---|---|
| 4,494,056 A * | 1/1985 | Nishijima | H02P 3/06 318/269 |
| 8,720,986 B2 * | 5/2014 | Nagase | B60J 7/0435 296/214 |

(Continued)

FOREIGN PATENT DOCUMENTS

| | | |
|---|---|---|
| JP | S63-207741 A | 8/1988 |
| JP | H05-8673 A | 1/1993 |

(Continued)

OTHER PUBLICATIONS

International Search Report dated Aug. 9, 2022, for the corresponding application No. PCT/JP2022/023809, with English translation.
(Continued)

*Primary Examiner* — David Luo
(74) *Attorney, Agent, or Firm* — LUCAS & MERCANTI, LLP

(57) ABSTRACT

A positioning device contains an actuator composed of a DC motor, a deceleration mechanism, and a single-phase rotation sensor for detecting the amount of rotational displacement of the deceleration mechanism, and an electronic control unit that electrically drives the DC motor. The electronic control unit learns the time required for the motor to stop after turning off the power, and decelerates and controls the DC motor to stop at a target rotation stop position, which is approximately midway between the rising edge and the falling edge of the output pulse of the rotation sensor.

13 Claims, 18 Drawing Sheets

《 Configuration of the control device 》

(51) Int. Cl.
  *B62D 1/181*   (2006.01)
  *H02K 7/116*   (2006.01)
  *H02K 11/215*  (2016.01)

(58) Field of Classification Search
  USPC .............................. 318/400.09, 400.01, 700
  See application file for complete search history.

(56)               References Cited

U.S. PATENT DOCUMENTS 8,803,458 B2 *   8/2014  Horikoshi ................. H02P 3/22
                                                       318/400.29
    9,294,031 B2 *   3/2016  Bessho ................ H02H 7/0858
 2013/0154534 A1     6/2013  Okada et al.

FOREIGN PATENT DOCUMENTS

JP       2003-189651 A    7/2003
  JP       2011-042280 A    3/2011
  JP       2011-176942 A    9/2011
  JP       2013-129251 A    7/2013
  JP       2015-145711 A    8/2015
  JP       2017-196979 A    11/2017
  JP       2021-000946 A    1/2021
  WO       2009/110321 A1   9/2009

OTHER PUBLICATIONS

Extended European Search Report, dated Jun. 24, 2025, which was issued for the corresponding European patent application No. 22841855.4, 8 pages.

* cited by examiner

A-Direction arrow exploded diagram

《 Configuration of the control device 》

Fig.17
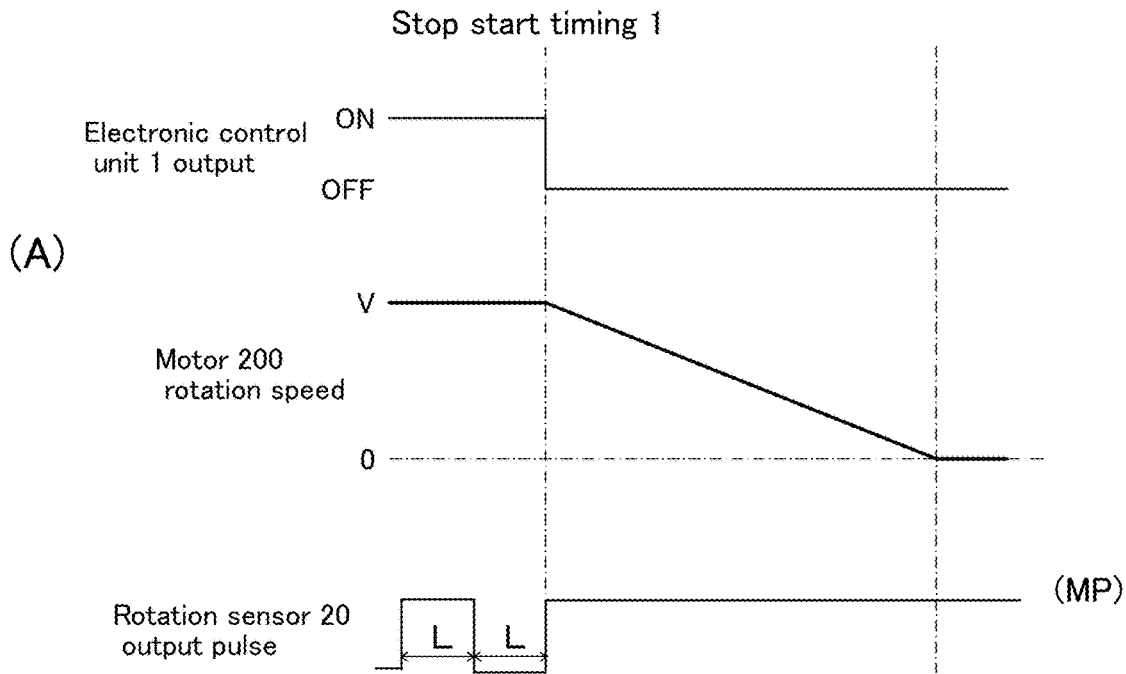
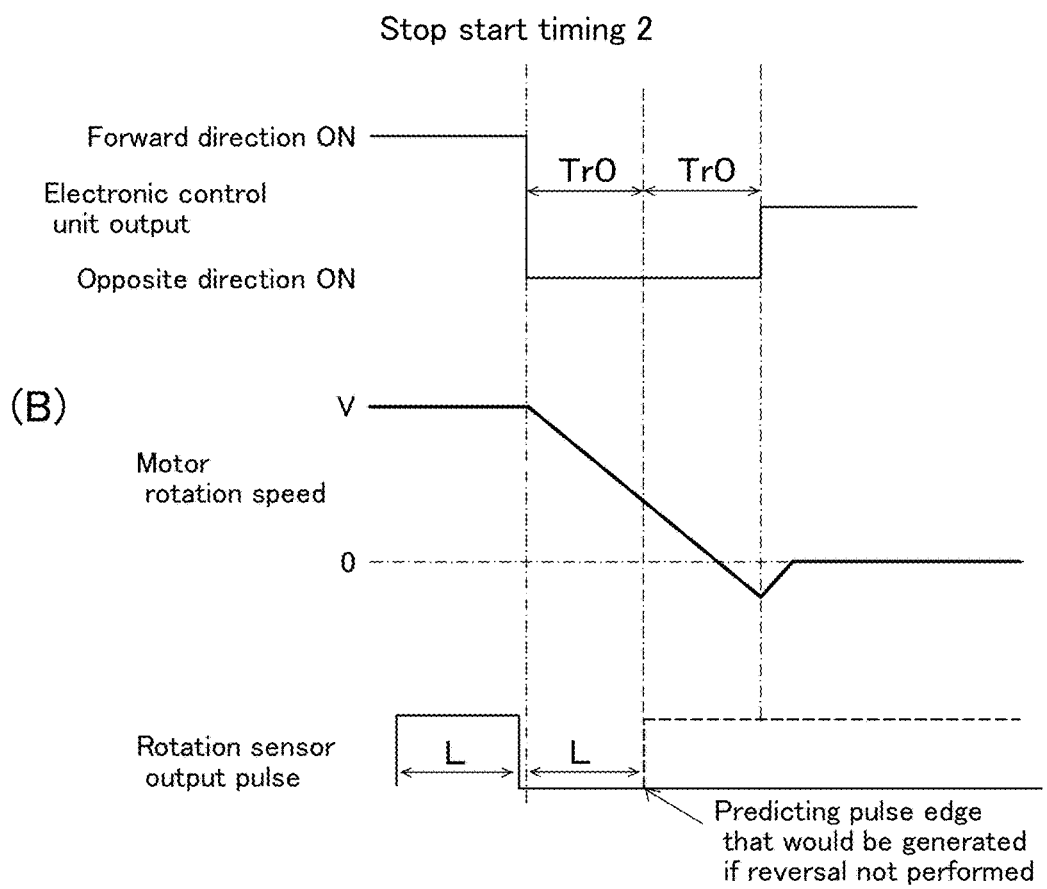

POSITIONING DEVICE AND CONTROL METHOD THEREOF

CROSS REFERENCE TO RELATED APPLICATION

This Application is a 371 of PCT/JP2022/023809 filed on Jun. 14, 2022, which, in turn, claims priority of Japanese Patent Application No. 2021-115632 filed on Jul. 13, 2021, and the above applications are incorporated herein by reference.

TECHNICAL FIELD

The present invention relates to an electric drive system that drives a moving body by an actuator incorporating an electric motor and controls it to a predetermined position. In particular, the present invention relates to a positioning device and a control method thereof, which are applied to a movable part such as an electric power seat of a vehicle and perform positioning control with high accuracy.

BACKGROUND ART

Conventionally this type of positioning device is mechanically coupled to the moving body to be driven. The positioning device is composed of an actuator composed of a DC motor, a speed reduction mechanism, and a rotation sensor that detects the amount of rotational displacement of the speed reduction mechanism, and an electronic control device that electrically drives the DC motor.

Specifically an electric power seat for a vehicle is known which is composed of an actuator 2 attached to the seat back shown in FIG. 1 and an electronic control device 1 which takes in a signal from an operation switch 3 and drives the actuator. A detailed example of the actuator portion is shown in FIG. 2.

In the actuator portion of FIG. 2, the second gear 212 fixed to the seat frame and the small diameter gear (not shown) arranged coaxially with the first gear 211 are meshed. The first gear and the worm gear 210 connected to the motor shaft are meshed.

With the configuration shown in FIG. 2, when the motor 200 is driven, the worm gear 210 rotates to rotate the first gear 211. The small-diameter portion (not shown) of the first gear revolves around the second gear 212 to electrically adjust the tilt angle of the seatback.

FIG. 3 is a diagram showing a detailed example of a rotation sensor portion. The rotation sensor portion consists of a magnet 201 consisting of a single pair of magnetic poles arranged coaxially with the rotation axis of the motor, and a Hall element 202 arranged in a fixed portion to detect the magnetic field generated by the magnet as an electric signal. The two constitute a known single-phase rotary encoder.

As a result, the Hall element 202 outputs an electrical signal of one pulse each time the rotating shaft of the motor makes one rotation. The electronic control unit 1 is configured to integrate the number of pulses in a predetermined direction, calculate the inclination angle of the seatback, and store the result.

The above configuration is applied not only to the tilt of the seat back, but also to control the longitudinal slide position of the seat and to control the height of the seat in the longitudinal direction. Since these various positioning controls can be electrically performed, a well-known memory power seat function is realized that reproduces arbitrary seat positions set for each of a plurality of drivers by one-touch operation.

By the way the single-phase rotary encoder cannot determine the rotation direction of the motor shaft from the output signal of the Hall element. Therefore, as described in Patent Document 1, when the driving of the motor is stopped when the driving mechanism reaches the end of the movable range, the motor is reversely driven by the reaction force on the load side. A deviation occurs between the actual position of the sheet and the position detected and stored by the device.

Therefore, according to Patent Document 1, when the motor stops at the end of the movable range, it is recognized as a mechanical lock, and the rotation pulses generated during the motor off period are accumulated as reverse rotation.

Alternatively a solution has been proposed for accurately storing the seat position, such as holding the operation request by the user until the motor rotation can be determined in order to prohibit short-time motor driving.

PRIOR ART PUBLICATION

Patent Publication

Patent Publication (1): Japanese Laid-Open Patent Publication No. 2011-42280

SUMMARY OF THE INVENTION

Problem(s) to be Solved by the Invention

However, the cause of erroneous detection of the movable position of each part of the seat by the rotation sensor is not limited to the reversal operation at the end of the movable range. In addition, the erroneous detection of the operating position of each part of the seat by the rotation sensor may be caused by the fact that the user's operation within the movable range is too short, causing the motor to stop before the rotation sensor generates a pulse.

For example, assuming that the stop position within the movable range is very close to the edge of the pulse output by the rotation sensor, after the power supply to the electronic control unit is cut off, the motor may slightly rotate due to an external force acting on each part of the seat. At this time, the physical rotation angle of the motor shaft due to such minute rotation of the motor may exceed the edge position of the output pulse of the rotation sensor. If the electronic control unit is energized again to change the seat position, one count of the number of pulses is lost.

Furthermore, if the stop position is very close to the edge of the pulse output by the rotation sensor, immediately after the rotation of the motor stops, the motor may rotate by a very small angle due to the backlash of the speed reduction mechanism or the like.

At this time, if the motor stops at the falling edge of the rotation sensor pulse, the rising edge in the opposite direction will be detected immediately after. Therefore, the electronic control unit recognizes that the movable part has moved by one pulse in the control direction, and erroneously recognizes that it has moved by one pulse more than the original stop position.

Therefore, there was a problem that if the playback operation of the memory power seat was repeated about 100 times, a large deviation from the originally set seat position would occur.

The present invention has been made in view of the above problems. The present invention relates to a positioning device composed of an actuator composed of a DC motor, a speed reduction mechanism, and a single-phase rotation sensor for detecting the amount of rotational displacement of the speed reduction mechanism, and an electronic control device for electrically driving the DC motor. The positioning device performs highly accurate positioning control without causing an error between the mechanical displacement amount of a controlled object and the integrated pulse number of a rotation sensor stored in an electronic control device.

Solution(s) to the Problem(s)

The present invention according to the first embodiment is a positioning device, comprising:
- an actuator connected to a moving body and composed of a DC motor, a speed reduction mechanism, and a single-phase rotation sensor for detecting an amount of rotational displacement of the speed reduction mechanism; and
- an electronic control device for electrically driving the DC motor,
wherein
the electronic control device comprises:
stop control means for performing a deceleration control so as to stop the DC motor, with a target rotation stop position set substantially midway between a rising edge and a falling edge of an output pulse of the rotation sensor; and
learning control means for learning the target rotation stop position.

The present invention according to the second embodiment is a positioning device, wherein said stop control means performs the deceleration control to decelerate and stop the DC motor in an inertial rotation mode in which a power supply to the DC motor is interrupted.

The present invention according to the third embodiment is a positioning device, wherein said stop control means performs the deceleration control to decelerate and stop the DC motor in a braking mode in which power supply terminals of the DC motor are electrically shorted.

The present invention according to the fourth embodiment is a positioning device, wherein said stop control means performs the deceleration control to decelerate and stop the DC motor in a forced braking mode in which an electric power is applied to power supply terminals of the DC motor to provide a rotational force in a direction opposite to the direction in which the DC motor rotates during an operation.

The present invention according to the fifth embodiment is a positioning device, wherein the learning control means:
detects a first timing for generating one of outputs of the rotation sensor; detects a second timing that is longer than the first timing and for generating other output of the rotation sensor; if the one of the outputs of the rotation sensor is detected at a third timing between the first timing and the second timing, sets the third timing as a new first timing; when the other output of the rotation sensor is detected, sets the third timing as a new second timing; at a new third timing between the new first timing or the original first timing and the new second timing or the original second timing, learns the target rotation stop position by detecting an output of the rotation sensor.

The present invention according to the sixth embodiment is a positioning device, wherein the output of the rotation sensor is repeatedly detected at the new third timing between the new first timing or the original first timing and the new second timing or the original second timing, and a substantially intermediate position between the rising edge and the falling edge of the output pulse is detected and learned.

The present invention according to the seventh embodiment is the positioning device, performing forced braking that applies a rotational force in the opposite direction at the forced braking interval determined by the new third timing.

The present invention according to the eighth embodiment is a positioning device, wherein the learning control means: detects a first timing for generating one of outputs of the rotation sensor; detects a second timing that is longer than the first timing and for generating an other output of the rotation sensor; if the one of the outputs of the rotation sensor is detected at a third timing, which is obtained by adding a predetermined amount to the first timing or subtracting a predetermined amount from the second timing, sets the third timing as a new first timing; when the other output of the rotation sensor is detected, sets the third timing as a new second timing; and learns the target rotation stop position by detecting an output of the rotation sensor at a new third timing in which the predetermined amount is added or subtracted.

The present invention according to the ninth embodiment is a positioning device, wherein at the new third timing in which the predetermined amount is added or subtracted, the output of the rotation sensor is repeatedly detected, and a substantially intermediate position between the rising edge and the falling edge of the output pulse is detected and learned.

The present invention according to the tenth embodiment is the positioning device, performing forced braking that applies a rotational force in the opposite direction at the forced braking interval determined by the new third timing.

The present invention according to the eleventh embodiment is a positioning device, wherein the moving body is an electric power seat for a vehicle.

The present invention according to the twelfth embodiment is a positioning device, wherein the moving body is an electric tilt/telescopic steering system for a vehicle.

Effect(s) of the Invention

The positioning device in claim 1 the first embodiment, the electronic control device comprises a stop control means for decelerating and stopping the DC motor with a target rotation stop position set at a substantially intermediate position between the rising edge and the falling edge of the output pulse of the rotation sensor; and learning control means for learning the target rotation stop position. The rotation stop position of the motor within the movable range of the moving body is not near the edge of the pulse output from the rotation sensor. Therefore, even if the motor is slightly rotated by an external force acting on each part of the seat, there is an effect that an erroneous pulse is not generated from the rotation sensor.

Therefore, even if the memory power sheet reproduction operation is repeated several hundred times or more, there is no deviation from the originally set seat position.

The positioning device in the second embodiment, the stop control means stops it at a target rotation stop position in an inertial rotation mode in which power supply to the DC motor is interrupted.

The positioning device in the third embodiment, the stop control means stops the DC motor at a target rotation stop position in a known braking mode in which the power supply terminals of the DC motor are electrically shorted. It is possible to stop the motor at an accurate target rotation position in a short period of time.

The positioning device in the fourth embodiment, the stop control means stops the DC motor at a target rotation stop position in a forced braking mode in which electric power is applied to power supply terminals of the DC motor to give a rotational force in a direction opposite to the direction in which the DC motor rotates during operation. It is possible to stop the motor at an accurate target rotation position in a shorter time.

The positioning device in the fifth embodiment, the learning control means comprising: detecting a first timing for generating one of the outputs of the rotation sensor; detecting a second timing that is longer than the first timing for generating other output of the rotation sensor; if the one of the outputs of the rotation sensor is detected at a third timing between the first timing and the second timing, the third timing is set as a new first timing; when the other output of the rotation sensor is detected, the third timing is set as a new second timing; at a new third timing between the new first timing or the original first timing and the new second timing or the original second timing, the target rotation stop position is learned by detecting the output of the rotation sensor. By detecting it, it is possible to learn the target rotation stop position which is approximately the intermediate position between the rising edge and the falling edge of the output pulse.

The positioning device in the sixth embodiment, the learning control means repeatedly detects the output of the sensor at a new third timing between the new first timing or original first timing and the new second timing or original second timing, by detecting it, it is possible to learn the target rotation stop position which is approximately the intermediate position between the rising edge and the falling edge of the output pulse.

The positioning device in the seventh embodiment, the learning control means can perform forced braking that applies a rotational force in the opposite direction at the forced braking interval determined by the new third timing, and the learning control means can learn the forced braking interval to stop the target rotation stop that is an intermediate position.

The positioning device in the eighth embodiment, the learning control means comprising: detecting a first timing for generating one of the outputs of the rotation sensor; detecting a second timing that is longer than the first timing for generating other output of the rotation sensor; if the one of the outputs of the rotation sensor is detected at a third timing, which is obtained by adding a predetermined amount from the first timing or subtracting a predetermined amount from the second timing, the third timing is as set a new first timing; when the other output of the rotation sensor is detected, the third timing is set as a new second timing; and the output of the rotation sensor is detected at a new third timing when the predetermined amount is added or subtracted. It is possible to learn a target rotation stop position that is approximately an intermediate position between the rising edge and the falling edge of the output pulse.

The positioning device in the ninth embodiment, the learning control means repeatedly detects the output of the rotation sensor at a new third timing when the predetermined amount is added or subtracted, and detects a substantially intermediate position between the rising edge and the falling edge of the output pulse, it is possible to learn the target rotation stop position which is approximately the intermediate position.

The positioning device in the tenth embodiment, the learning control means can perform forced braking that applies a rotational force in the opposite direction at the forced braking interval determined by the new third timing, it is possible to learn the forced braking interval to stop the target rotation stop position which is the intermediate position.

BRIEF DESCRIPTION OF THE DRAWINGS

FIG. 17 shows (A) a case where the motor is stopped by turning off the output of the electronic control unit at the timing of the pulse edge, and (B) a case when the motor reverse output is applied to the motor.

MODE TO CARRY OUT THE INVENTION

EMBODIMENT

Figure 1:
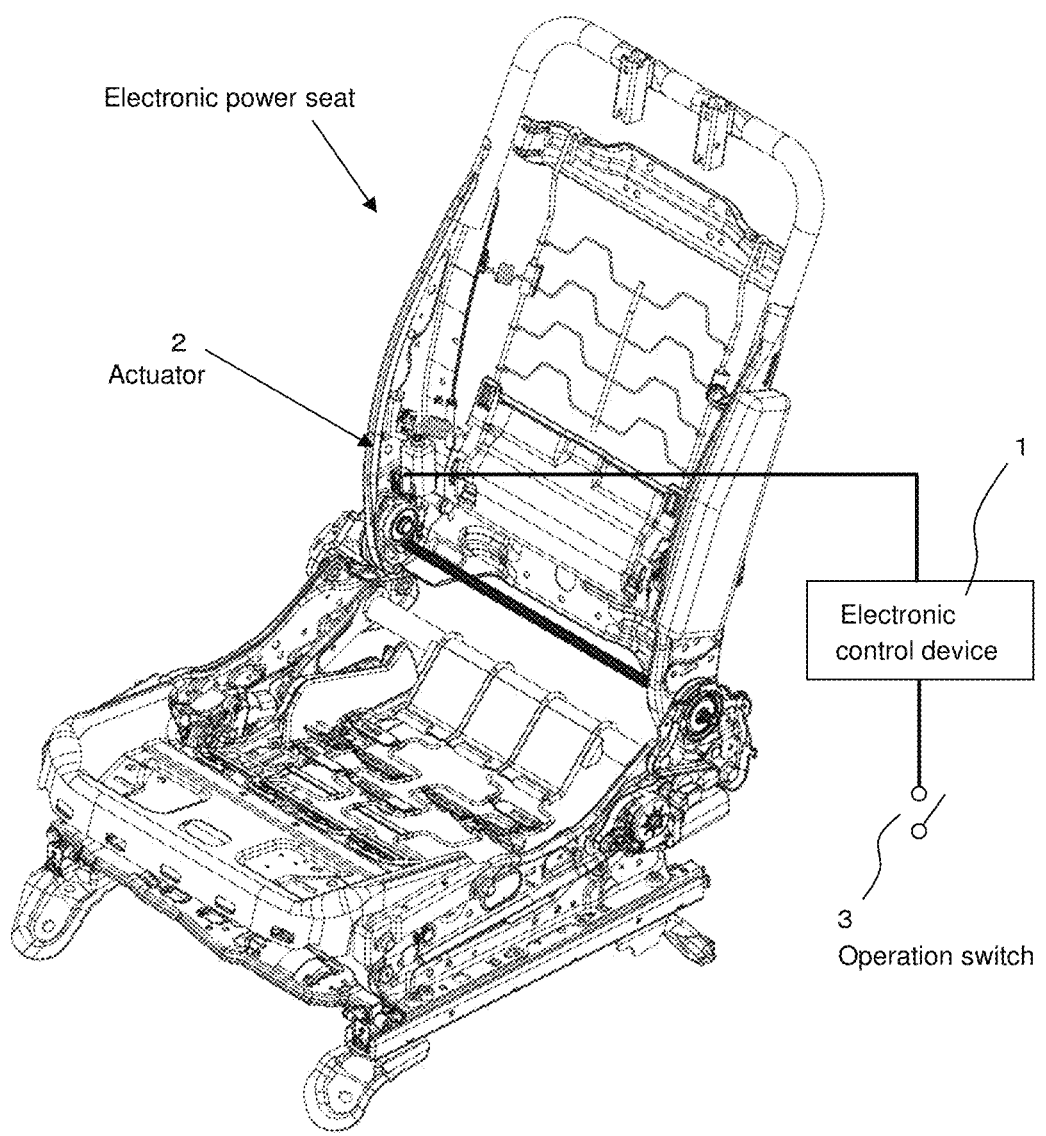
FIG. 1 is a diagram showing the structure of an electric power seat.

[Embodiment]
Hereinafter, embodiments of a positioning device and a control method thereof according to an embodiment of the present invention will be described with reference to each drawing. FIG. 1 shows the overall structure of an electric power seat. A reclining actuator 2 is fixed to a frame forming an internal skeleton of the electric power seat. It has an electronic control unit 1 that electrically controls the actuator 2 and receives a signal from the operation switch 3.

Figure 2:
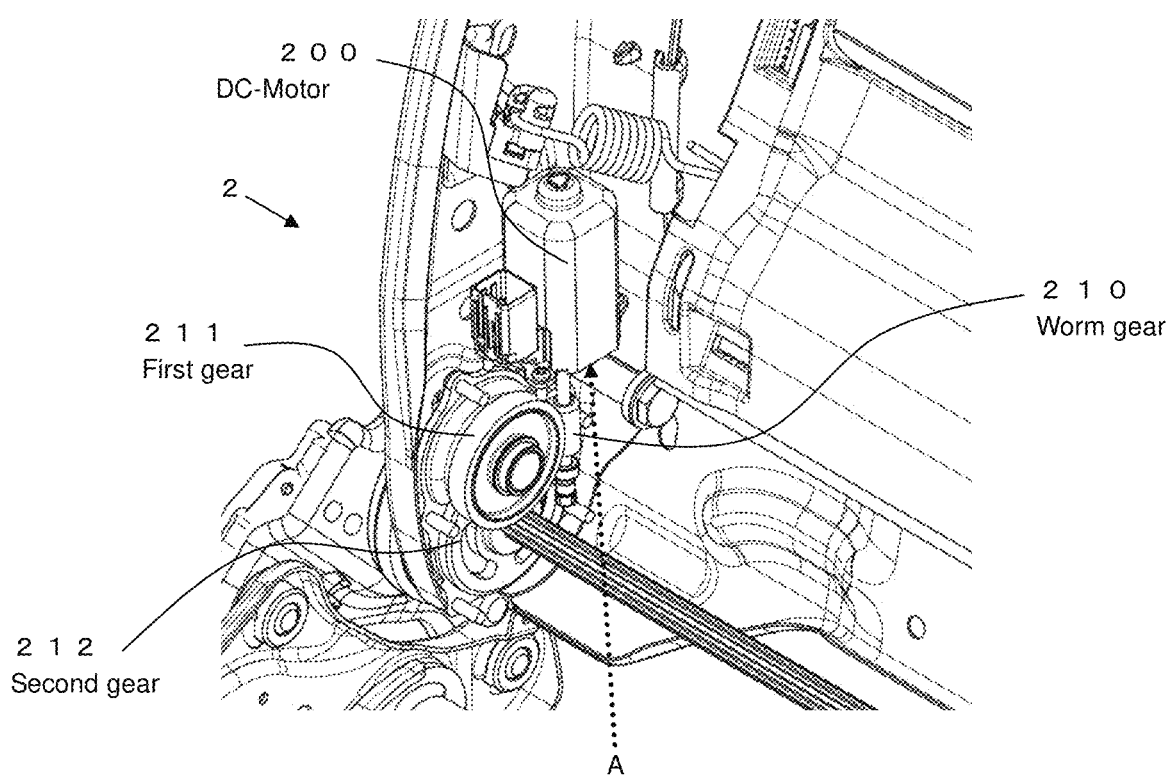
FIG. 2 is an enlarged view of the vicinity of the reclining actuator.
Figure 3:
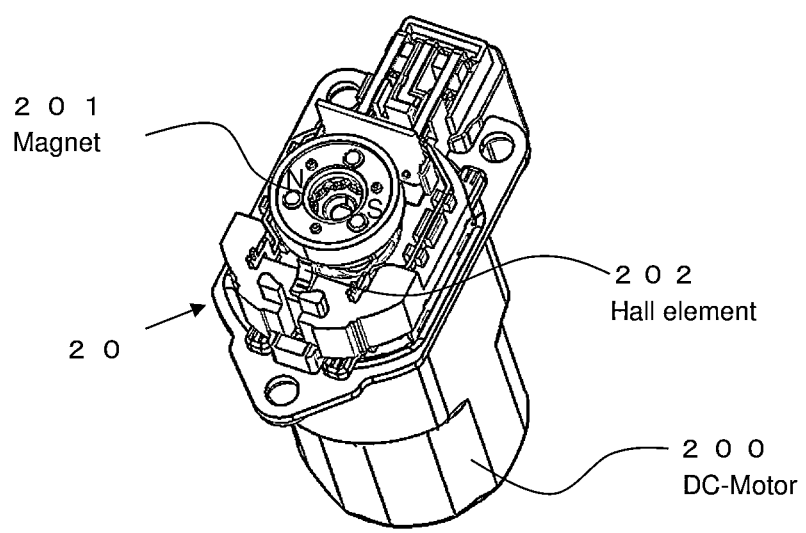
FIG. 3 is a diagram showing the structure of a DC motor and a rotation sensor.

The actuator 2 comprises a DC motor 200, a worm gear 210, a first gear 211 and a second gear 212, as shown in FIG. 2. FIG. 3 shows the internal structure of the motor viewed from direction A.

The magnet 201, shown in FIG. 3, is a ring-shaped ferrite magnet having a pair of N and S magnetic poles that is coaxially connected to and fixed to the rotor of the DC motor 200, and rotates in conjunction with the rotor of the motor 200.

Figure 4:
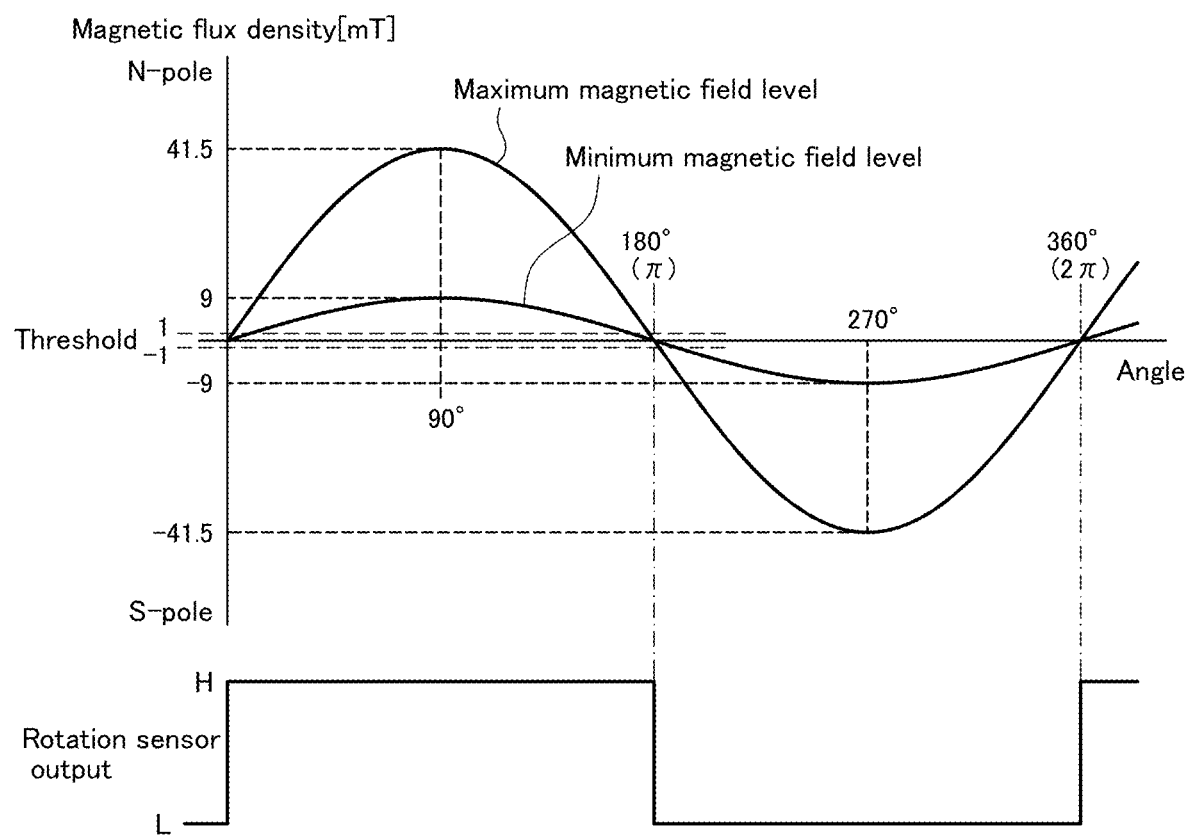
FIG. 4 is a diagram explaining the action of the rotation sensor.

A Hall element 202 is fixed to a fixed portion that is integrated with the housing of the motor at a distance of about 2 mm close to the magnet. With this structure, when the magnet 201 rotates in conjunction with the rotor of the motor 200, the magnetic flux density of the Hall element 202 changes sinusoidally with a rotor angle of 360 degrees of the motor 200 as one cycle, as shown in FIG. 4.

The Hall element 202 is configured such that the output signal is processed by a known comparator circuit (not shown) and signal-converted into a rectangular wave synchronized with the sine wave using a magnetic flux density of ±1 mT as a threshold. An electrical hysteresis is provided to avoid chattering of the output signal near the threshold, and the magnetic flux density conversion value corresponding to this hysteresis is ±1 mT.

Errors in the magnetization level of the magnet 201, changes in temperature, variations in magnetomotive force due to deterioration in durability and variations in assembly gap between the magnet 201 and the Hall element 202 affect the Hall element. Furthermore, variations in the sensitivity of the Hall element 202 and the like have an effect. Thereby the magnetic flux density of the Hall element 202 changes. The maximum magnetic field level and the minimum magnetic field level, shown in FIG. 4, are approximate representations of the varying magnetic flux density at the Hall element 202 portion.

The ±1 mT threshold is set because it is necessary to set a sufficiently small threshold compared to the magnetic flux density at the minimum magnetic field level.

As described above, the output signal of the Hall element 202 is converted into a rectangular wave and output as a rotation signal of the motor 200 by comparing it with a threshold voltage obtained by replacing the magnetic flux density with an electrical level by a comparator (not shown).

Here, as is clear from the comparison of the threshold value and the sine wave magnetic flux density near the edge of the rectangular wave output of the comparator, the rectangular wave signal of the comparator output is inverted at a minute rotation angle of the magnet 201.

Hereinafter, the magnet 201, the Hall element 202, and the comparator that outputs the rectangular wave signal (not shown) are collectively referred to as a rotation sensor 20.

Here, assuming that the rotation stop position of the motor 200 when the electronic control unit 1 drives the reclining mechanism of the electric power seat is extremely close to the edge of the pulse output from the rotation sensor 20. After the energization of the motor 200 is cut off, the motor 200 may slightly rotate due to an external force acting on each part of the seat.

At this time, the rotation angle of the physical shaft due to such minute rotation of the motor 200 may exceed the edge position of the output pulse of the rotation sensor 20, and when the motor 200 is energized again to change the seat position, The number of pulses for the one count is missing.

Furthermore, when the rotation stop position of the motor 200 is very close to the edge of the pulse output by the rotation sensor 20, immediately after the rotation of the motor 200 stops. At that time, due to the backlash of the worm gear 210, the first gear 211, and the second gear 212, the motor 200 may rotate by a small angle immediately after stopping.

At this time, if the motor 200 stops at the falling edge of the pulse from the rotation sensor 20, the rising edge in the opposite direction may be detected immediately after. At that time, the electronic control unit 1 recognizes that the reclining mechanism has moved by one pulse in the control direction, and erroneously recognizes that it has moved by one pulse more than the original stop position.

The electric power seat of the embodiment can store optimal driving positions set by a plurality of users, and at the same time, can correctly reproduce the position set by each user.

The electronic control unit 1 stores the seat positions such as the reclining position, the front-rear position, and the seat height position operated by the user at the time of initial setting. That is, the electronic control unit 1 stores the seat position by counting and integrating pulses output from the rotation sensor 20 while the actuator 2 is operating.

Next, when another user changes each position, the electronic control unit 1 recounts the number of output pulses of the rotation sensor 20, integrates and stores the amount of change. When the user who has made the initial settings operates the switch 3, the electronic control unit 1 energizes the DC motor 200 of the actuator 2 and counts the number of output pulses of the rotation sensor 20 at the same time. And, the electronic control unit 1 matches the initial setting value and the integrated value. As a result, the initially set seat position can be reproduced.

However, when the motor rotation stop position is very close to the edge of the pulse output from the rotation sensor 20 as described above, the electronic control unit 1 may erroneously determine the motor rotation angle by one count of the output pulse from the rotation sensor 20. As a result, the user's initial setting position or the reproduced sheet position is deviated.

Figure 5:
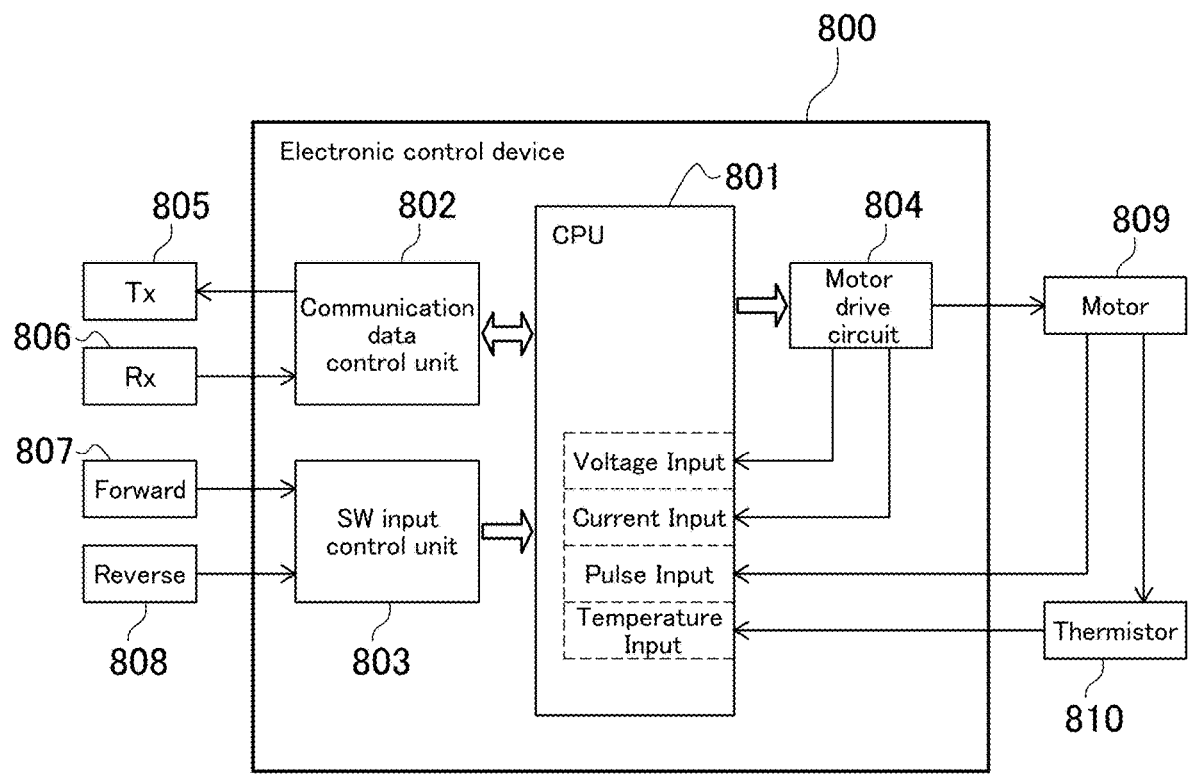
FIG. 5 is a diagram showing the configuration of a control device.

A configuration diagram of the control device 800 is shown in FIG. 5. The control device 800 is controlled by a CPU 801. A communication data control unit 802 is connected to the CPU 801 and can operate in cooperation with other control units via the communication data control unit 802. The control device 800 information is transmitted via Tx 805. Further, information necessary for motor driving such as motor driving timing and motor movement target point is received via Rx806.

Also, the SW input control unit 803 can detect the states of the direction designation switches 807 and 808 to drive the motor.

A motor 809 is driven by the CPU 801 via a motor drive circuit 804. The motor drive circuit 804 drives the motor by opening the power supply terminals, shorting the power supply terminals, inverting the polarity of the applied voltage, outputting the motor ON/OFF signal. An H bridge circuit is used for the motor drive circuit 804.

A pulse signal output from a motor 809, a signal from a thermistor 810 for measuring motor temperature, a current signal flowing through a motor drive circuit 804, and a voltage signal applied to the motor are connected to a CPU 810. The CPU can grasp the state of the motor.

Figure 6:
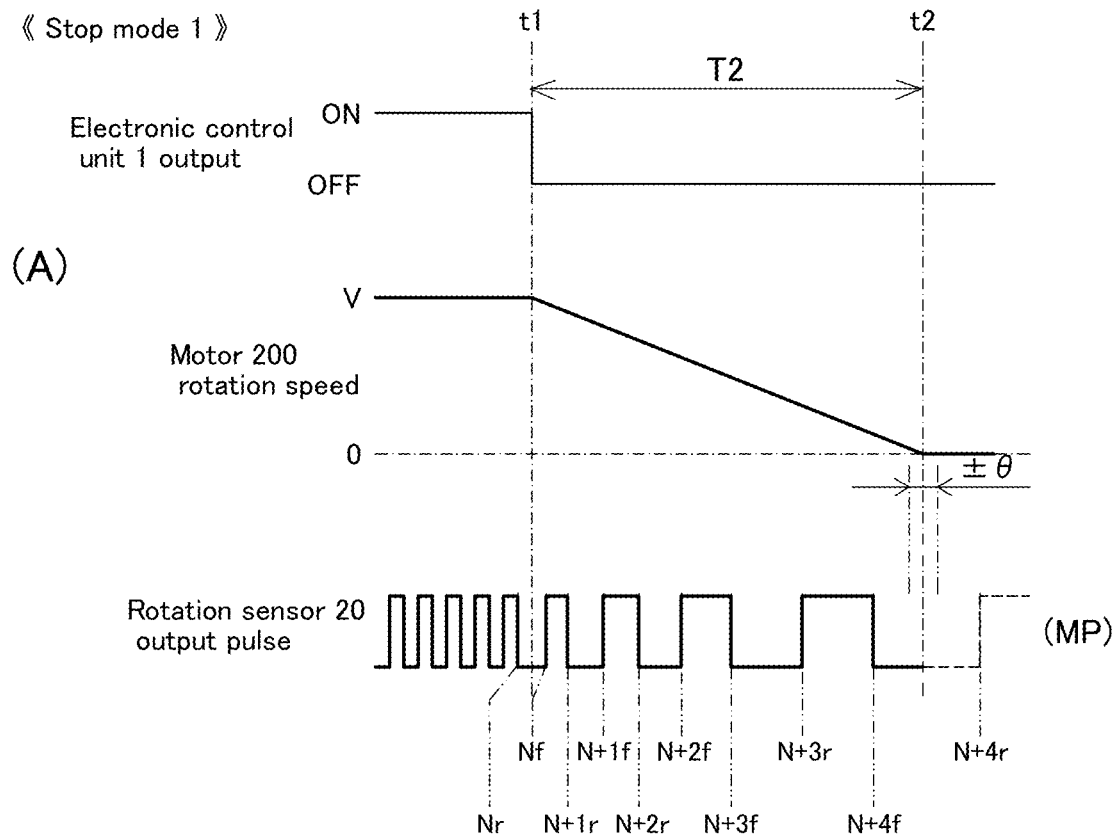
FIG. 6 shows (A) a diagram showing a motor stop and a stop position, and (B) a diagram showing a motor stop and a stop position during reverse direction bias.

FIG. 6(A) shows the most basic embodiment of the positioning device and its control method of the present invention. The electronic control unit 1 integrates the output pulses of the rotation sensor 20, and a case where the vicinity of the N+4 count is set as the target rotation stop position is shown.

In FIG. 6(A), until time t1, the electronic control unit 1 energizes the power supply terminals (not shown) of the DC motor 200 to move the reclining mechanism in a predetermined direction. At this time, the motor rotation speed is v, and the rotation sensor 20 outputs a rectangular wave pulse with a predetermined cycle.

The electronic control device 1 has previously learned the time T2 required from turning off the power to stopping the motor. At the time t1, the electronic control unit 1 opens the power supply terminal to the DC motor 200 and stops energizing the DC motor 200 to start stopping the motor (inertial rotation mode).

By stopping the energization, the DC motor 200 gradually slows down. Then, the DC motor 200 stops at time t2 near the middle (target rotation stop position MP) between the fall f of the N+4 count and the rise r of the N+4 count of the output pulse of the rotation sensor 20 counted by the electronic control unit 1.

As a result, the rotation stop position of the DC motor 200, that is, the rotation stop position of the rotation sensor 20, stops near the middle between the falling edge f and the rising edge r of the pulse output by the rotation sensor 20. Therefore, even if the motor 200 is rotated by an external force after stopping as described above, an erroneous pulse is not generated unless the motor 200 is rotated by ±90 degrees or more.

In the example in FIG. 6(A), the DC motor is stopped at the center of the rising edge and the falling edge of the pulse. However, the stop is not limited to this, and may be at the middle of the pulse edges appearing at the rise and fall of the pulse.

The period T2 from time t1 to t2 can take different values depending on the deceleration factor of the motor.

The deceleration factors include the presence or absence of braking force due to the frictional force of the mechanism and the regenerative current of the motor, and a plurality of these factors may be combined. Braking by regenerative current is a well-known technology and is not illustrated here.

As another mode, as shown in FIG. 6(B), a method of braking by a reverse rotation bias is applied to the power supply terminal to apply power (reverse voltage) that gives a rotational force in a direction opposite to the direction of rotation of the motor (forced brake mode). In this case as well, braking (brake mode) using the frictional force of the mechanism or the regenerative current of the motor may be combined with the reverse braking.

When the frictional force of the mechanism or the motor load fluctuates greatly the overall braking force can be increased by applying regenerative current braking (brake mode) that electrically shorts the power supply terminals of the motor, or braking by reverse bias.

It is also possible to use a combination of two or more of the inertial rotation mode, forced braking mode, and braking mode described above.

Figure 8:
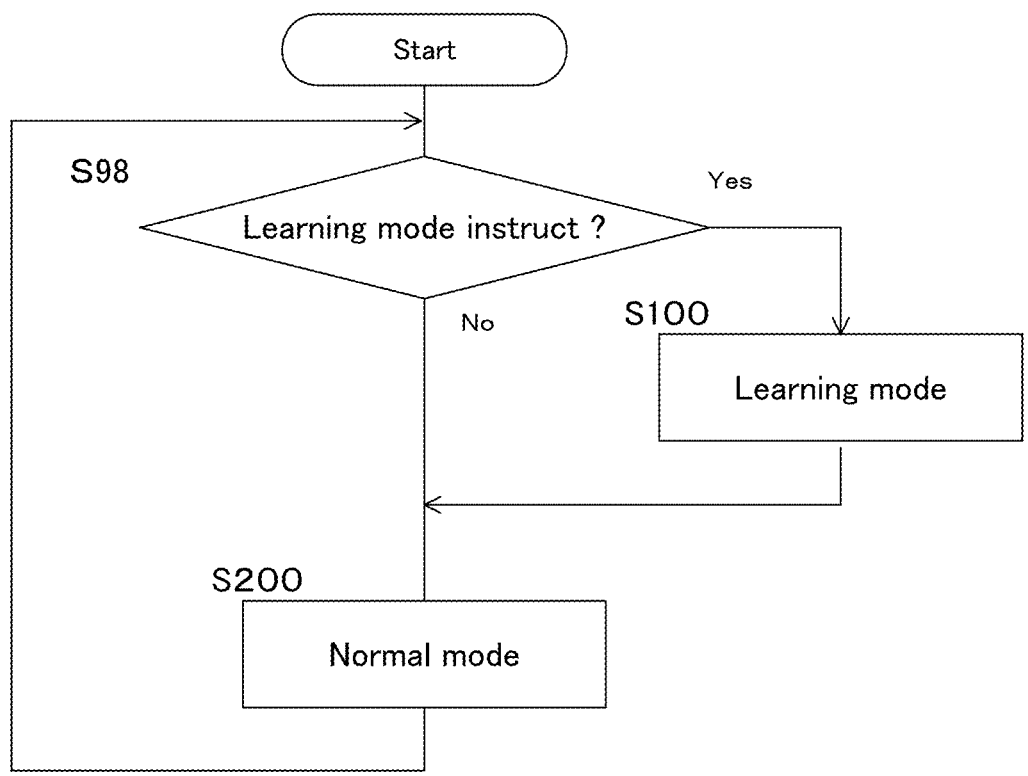
FIG. 8 is a diagram showing the overall CPU control flow.

The overall control flow of the CPU 801 in FIG. 5 will be described with reference to FIG. 8.

The CPU 801 determines whether learning mode has been instructed (S98). The learning mode is instructed by a command via communication from the tester at the time of inspection before shipping the vehicle, or at the time of inspection before vehicle inspection. Instead of a command, a start switch may be provided. When the learning mode is instructed (S98: Yes), the learning mode is started, and The CPU 801 learns the time T2 for stopping the motor at a position near the middle between the fall f of the output pulse and the rise r (target rotation stop position MP) after turning off the motor output signal mentioned above (S100). Unless the learning mode is instructed (S98: No), the normal mode is executed (200). In the normal mode, the motor is controlled, the seat position is adjusted, and the motor is controlled to stop using the time T2 determined in the learning mode when the motor is stopped.

Figure 9:
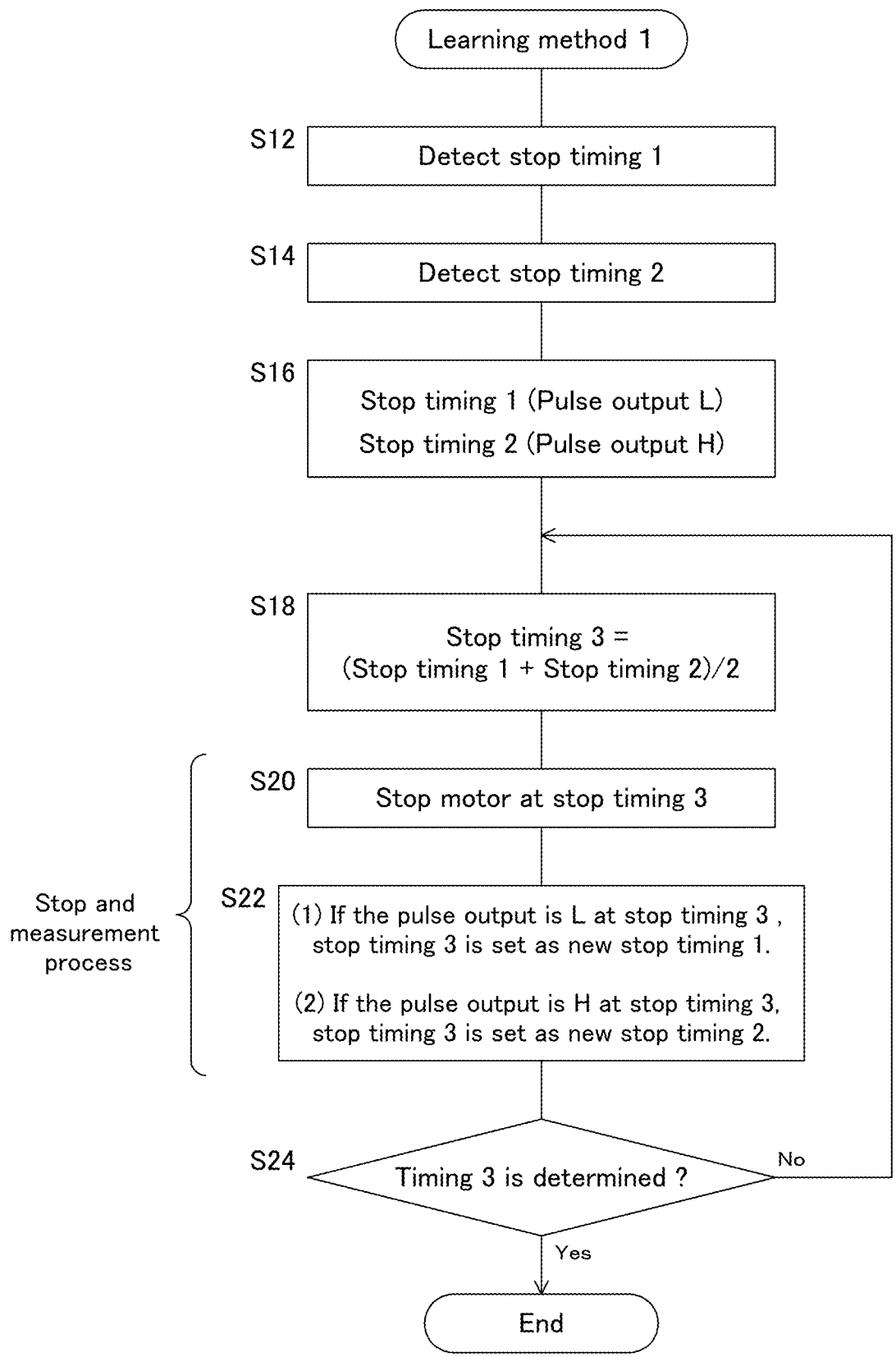
FIG. 9 is a diagram showing a flow of learning mode of the CPU.

FIG. 9 shows a control flow of the learning mode of the CPU 801.

Figure 7:
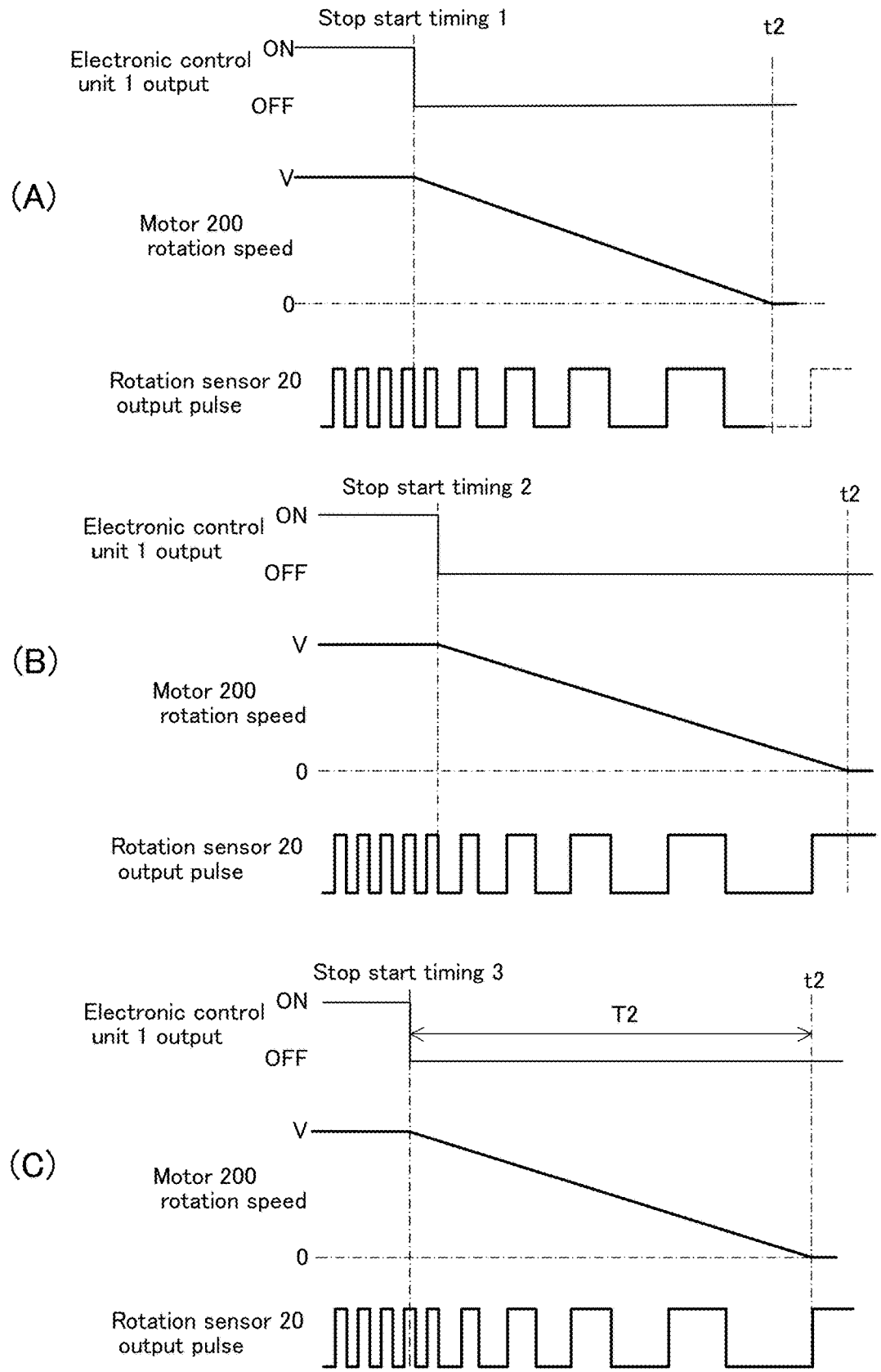
FIG. 7 is a diagram showing a motor stop and a stop position during motor output adjustment.

In steps S12, S14, and S16, stop timing 1 and stop timing 2, which have different pulse outputs when the motor is stopped, are found. In step S12, as shown in FIG. 7(A), a stop timing 1 at which the pulse output when the motor is stopped is L is searched. In step S14, a stop timing 2 at which the pulse output when the motor is stopped is H is searched, as shown in FIG. 7(B). It is necessary to prevent two or more pulse edges from occurring between stop timing 1 and stop timing 2. Further, the stop timing 2 is after the stop timing 1. In subsequent processing, by adjusting stop timing 1 and stop timing 2, stop timing 3 for stopping at a pulse edge is learned, as shown in FIG. 7(C).

In step S18, the stop timing 3 is between the stop timing 1 and the stop timing 2, in this case exactly in the middle.

$$\text{Stop timing3} = (\text{stop timing1} + \text{stop timing2})/2$$

If it is desired to find stop timing 3 from either stop timing 1 or stop timing 2, this can be done by changing the denominator.

In step S20, the motor is stopped at stop timing 3.

Figure 10:
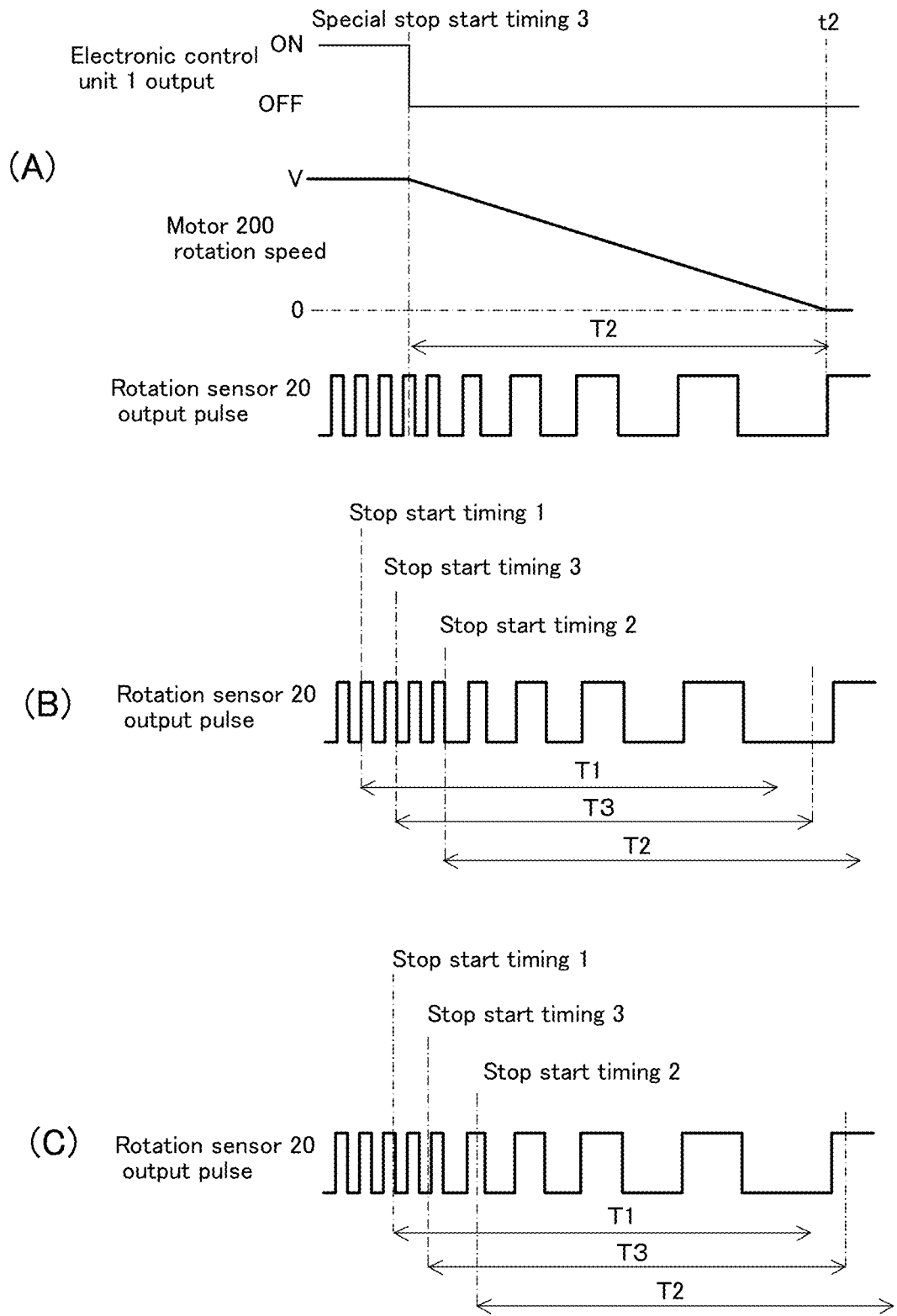
FIG. 10 is an explanatory diagram of stop timing in learning mode.

Then, in step S22, (1) if the pulse output is L at stop timing 3 as shown in FIG. 10(B), stop timing 3 is set as new stop timing 1. In other words, if the pulse output is the same output L that stopped at stop timing 1, special stop timing 3 (timing 3 to stop at the pulse edge) exists between the current stop timing 3 and stop timing 2.

On the other hand, (2) if the pulse output is H at stop timing 3 as shown in FIG. 10(C), stop timing 3 is set as new stop timing 2. That is, if the pulse output is the same output H that stopped at stop timing 2, special stop timing 3 will exist between the current stop timing 3 and stop timing 1.

After the determination in step S24, the process returns to step 18, and at the new third timing between the new first timing or the original first timing and the new second timing or the original second timing, stopping at a new stop timing 3 in step S20. The output of the rotation sensor is detected in step S22 and the stop timing 1 and stop timing 2 are adjusted again to find special stop timing 3.

By repeating this, the determined stop timing 3 approaches the special stop timing 3. At this time, if the stop timing is made to be as close to stop timing 3 as the resolution allows, the number of times the "stop and measurement process" is executed will increase and it will take time. Therefore, in step S24, when the difference between the previous stop timing 3 and the current stop timing 3 becomes sufficiently small, the stop timing 3 is determined (S24: Yes) and the process ends.

Figure 14:
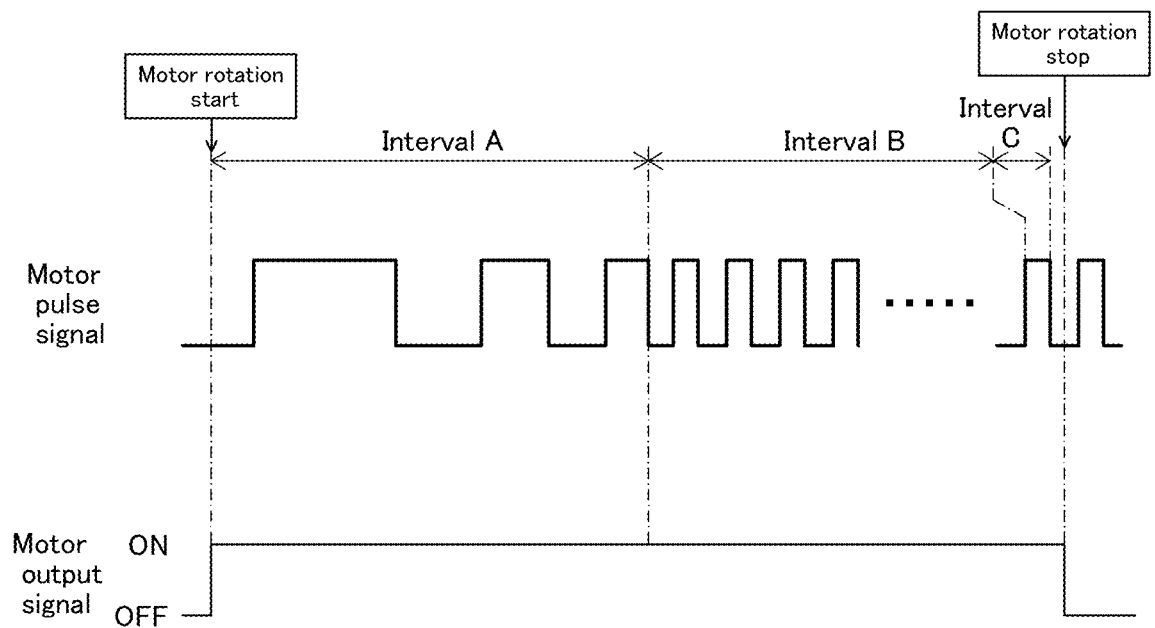
FIG. 14 is a diagram showing pulse signals according to the motor rotation state.

Details regarding pulse edge spacing measurements are shown in FIG. 14.

Motor speed can be measured by measuring pulse edge spacing. When measuring speed using the average pulse edge interval, in order to accurately measure the speed during steady rotation, the speed is calculated from the average of the pulse edge intervals that occur during the period B from the end of the motor start-up period A to the start of the motor stop. Furthermore, when the speed is measured using the pulse edge interval immediately before the motor stops, the speed is calculated from the pulse edge interval of period C.

The forced brake mode will be explained using FIG. 17. FIG. 17(A) shows a case where the forced brake interval is set to 0 and the output of the electronic control device 1 is turned off at pulse edge timing to stop the motor.

FIG. 17(B) shows a case where a motor reverse rotation output is applied to the motor from the electronic control device 1 to stop the motor. The reversal output is applied by predicting the pulse edge that would be generated if the reversal is not performed, and by an interval of Tr0 before and after that timing. In the case of FIG. 17(B), since the reversal interval (2×Tr0) is large, it shows that the motor stops without generating a pulse edge. The motor stop timing in FIG. 17(B) is the timing at which the motor starts rotating in reverse.

In the states shown in FIGS. 17(A) and 17(B), there is no signal indicating the timing at which the motor has completely stopped. Therefore, it is not possible to measure at what interval the output of the electronic control device 1 should be output in the reverse direction so that the motor completely stops at the same time as the reverse rotation ends.

Figure 18:
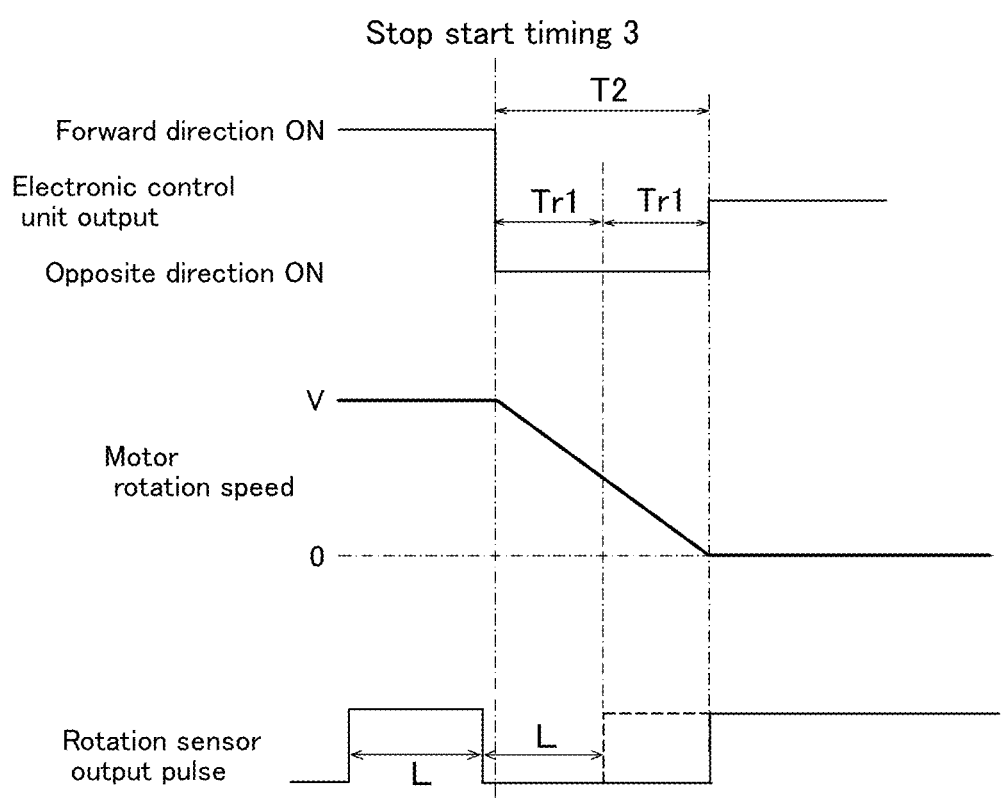
FIG. 18 is a diagram showing a case where a motor reverse rotation output is applied to the motor.

FIG. 18 shows a case where the reversal interval (2×Tr0) is decreased and the reversal is performed at an interval of (2×Tr1). This shows that if a reverse rotation output is applied to the motor at stop timing 3, which is between output stop timing 1 and stop timing 2, it is possible to make the motor complete stop timing coincide with the output edge of the pulse signal.

In this way when the motor complete stop timing and the output edge of the pulse signal overlap, T2 can be measured by measuring the time from the start of the reverse rotation output of the electronic control device 1 to the pulse edge.

Stop timing 3 when the motor complete stop timing and the output edge of the pulse signal overlap is defined as special stop timing 3. The motor stop timing in FIG. 18 is the timing to start reverse rotation of the motor.

In FIGS. 17(B) and 18, the reversal time is changed in accordance with the change in the motor stop timing.

Figure 11:
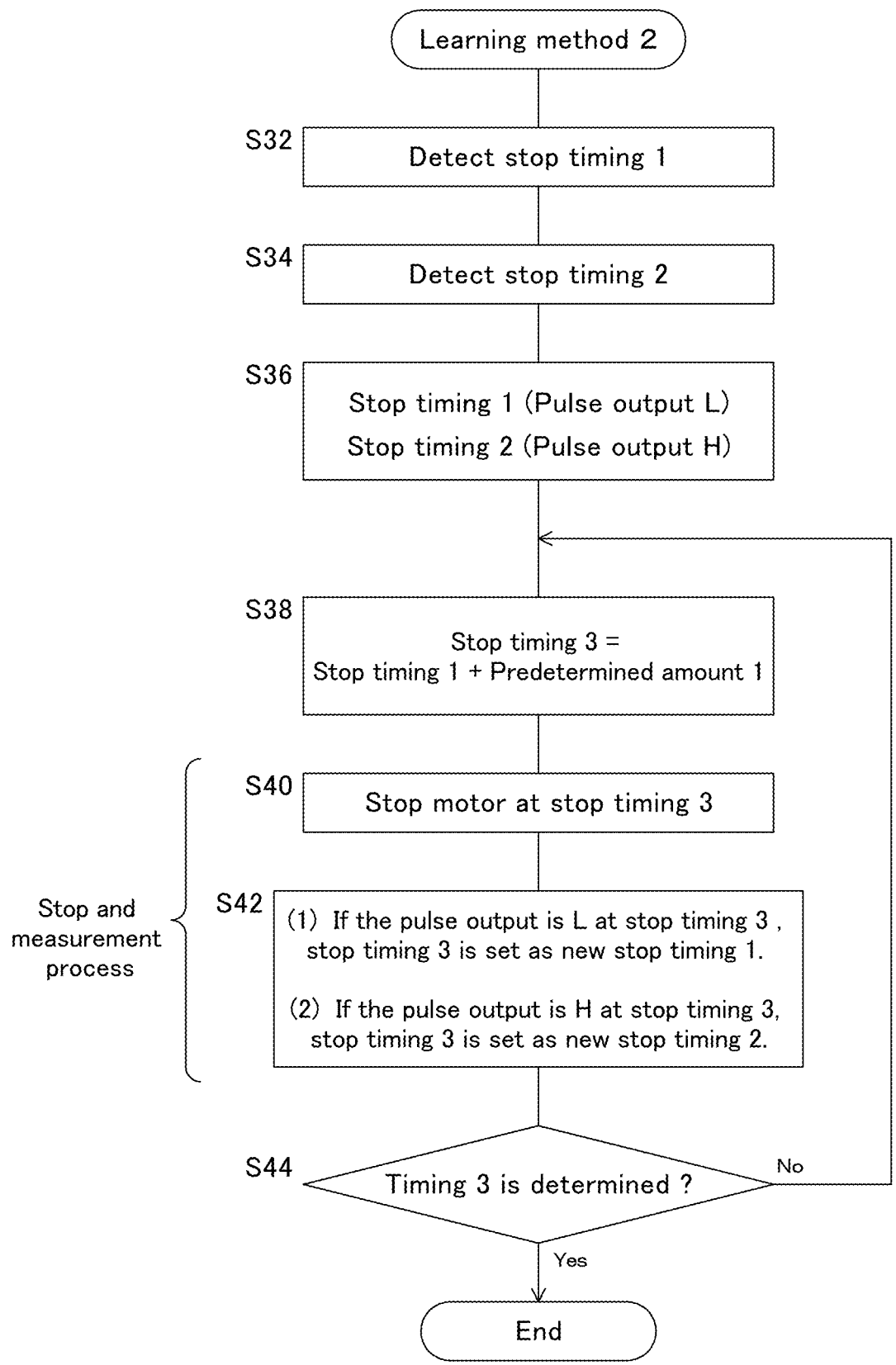
FIG. 11 is a diagram showing a flow of a learning mode in another modified example of the CPU.

An example of a modification of the learning method is shown in FIG. 11.

Similarly to steps S12 to S16 in FIG. 9, stop timing 1 and stop timing 2 with different pulse outputs are found in steps S32 to S36.

In step S38, stop timing 3 is determined from between stop timing 1 and stop timing 2. Here, the timing at which the stop timing 1 is moved by a predetermined amount 1 toward the stop timing 2 side is defined as the stop timing 3.

Stop timing 3=Stop timing 1+Predetermined amount 1

Alternatively the stop timing 3 can be set to a timing that is moved from the stop timing 2 by a predetermined amount 1 toward the stop timing 1 side.

Stop timing 3=Stop timing 2−Predetermined amount 1

In step S40, the motor is stopped at stop timing 3.

Then, in step S42, (1) if the pulse output is L at stop timing 3, stop timing 3 is set as new stop timing 1; That is, if the pulse output is the same output L as that which was stopped at stop timing 1, special stop timing 3 will exist between current stop timing 3 and stop timing 2.

On the other hand, (2) if the pulse output is H at stop timing 3, stop timing 3 is set as new stop timing 2; That is, if the pulse output is the same output H as that which was stopped at stop timing 2, special stop timing 3 will exist between the current stop timing 3 and stop timing 1.

Then, after the determination in step S44, the process returns to step 38, and at the new third timing between the new first timing or the original first timing and the new second timing or the original second timing, stopping at a new stop timing 3 in step S40. The output of the rotation sensor is detected in step S42 and the stop timing 1 and stop timing 2 are adjusted again to find special stop timing 3.

Then, when the stop timing 3 is determined (S44: Yes), the process ends.

Figure 12:
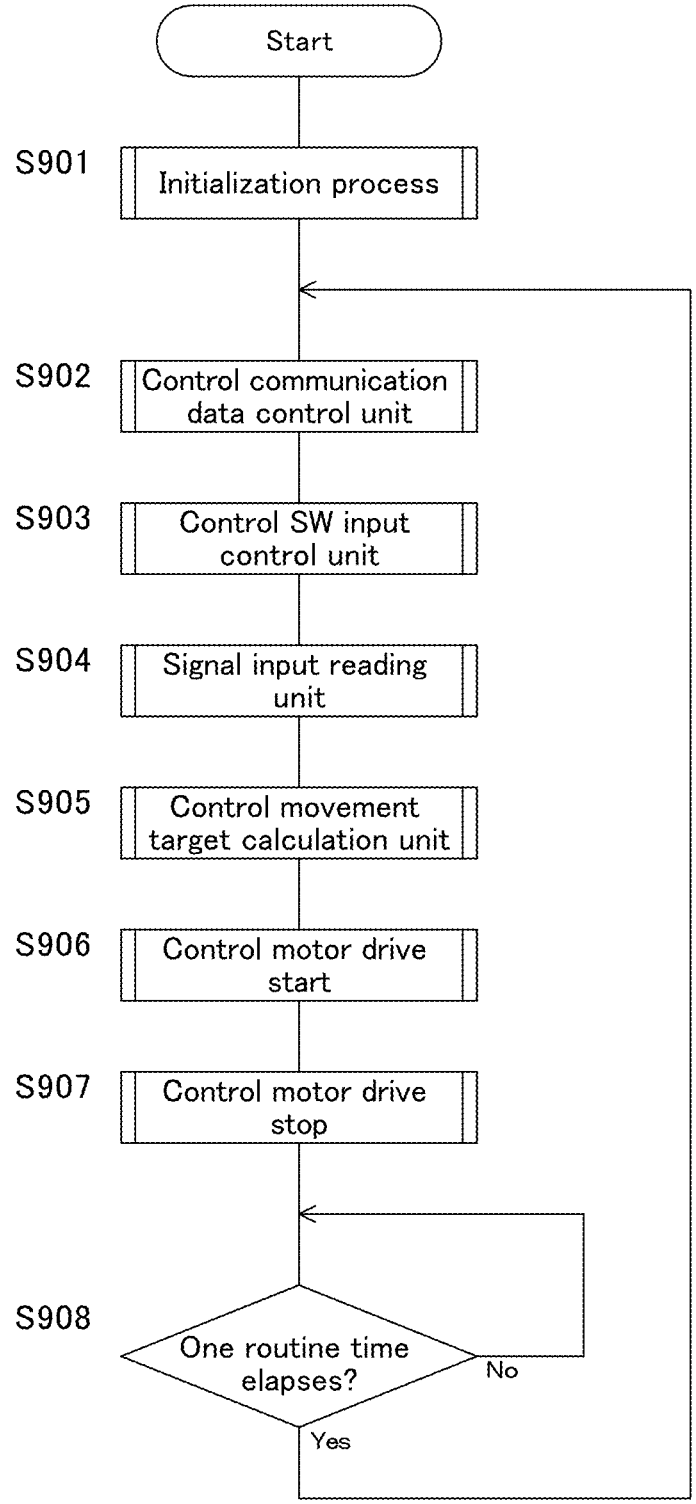
FIG. 12 is a diagram showing a control flow in normal mode.

An overall control flow of the CPU 801 in FIG. 12 will be described. When the CPU is powered on, the flow shown in FIG. 12 is started. First, initialization processing is executed in step S901. In this initialization process, CPU ports and internal timers are initialized, and memory initial values are set. This initialization process is executed only once after the CPU is powered on.

Next, in step S902, the communication data control unit is controlled. In this control, data received by the communication data control unit 802 is extracted and data to be transmitted is written to the communication data control unit 802.

Next, in step S903, the SW input control unit 803 is controlled. In this control, chattering absorption processing is performed to determine the state of the SW, and the drive request for the motor is set/reset according to the determined state of the SW.

Next, in step S904, reading of signal input is controlled. In this control, the current flowing through the motor, the voltage applied to the motor, the motor pulse signal, and the motor temperature are read and stored in memory.

Next, in step S905, movement target calculation unit control is performed to calculate the target movement position when the motor moves to any of a plurality of positions registered in advance or when it moves by a specified amount from the current position. The current position and movement position are memorized by a pulse counter that counts the output of the hall sensor, and the drive request for the motor is set/reset according to the difference between the target position and the current position.

Next, in step S906, motor drive start control is performed. In this control, the motor is driven by designating the motor ON/OFF signal to the motor drive circuit 804 in accordance with the set/reset state of the above drive request.

Next, in step S907, motor drive stop control is performed. In this control, a motor ON/OFF signal is designated to the motor drive circuit 804 to end the motor drive.

Finally, in step S908, one routine time elapses, and when a predetermined time elapses, steps S902 to S907 are executed again.

Details of the Motor Stop Mode Will Now be Described

Figure 13:
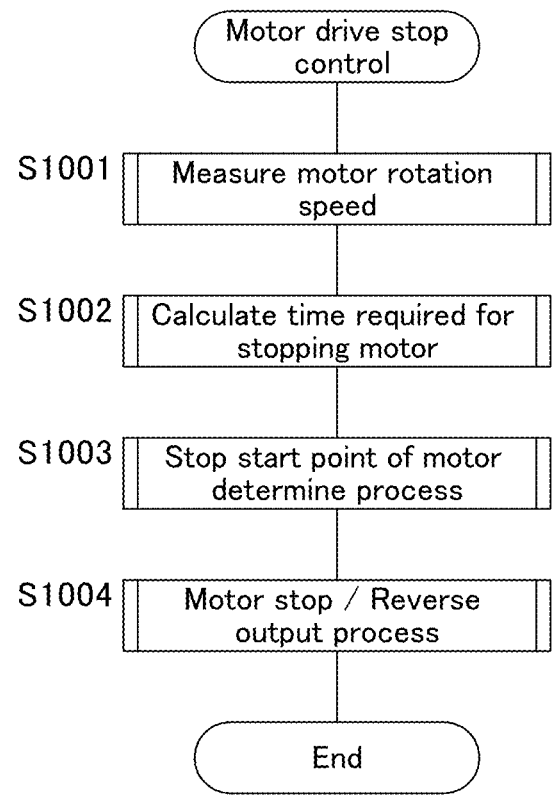
FIG. 13 is a diagram showing a motor drive stop control flow.

First, the motor drive stop control flow in FIG. 13 will be described. In step S1001, the speed during motor driving is calculated. The speed can be calculated by measuring the average pulse edge interval during motor driving or the pulse edge interval time immediately before stopping the motor.

Details regarding this pulse edge interval measurement are described in FIG. 14(A).

In order to accurately measure the speed during steady-state rotation, the average pulse edge interval is calculated by averaging the pulse edge intervals generated during the period B from the end of the motor rise period A to the start of the motor stop. Period C may be adopted as the final pulse edge interval.

This will

Angular Velocity Calculated from "Average Time Between Pulse Edges in Period $B$ $(T0avr)$"=$\pi$/$T0avr=\omega avr$ and The Angular Velocity Calculated from "the Time ($T0sgl$) of the Final Pulse Edge Interval (Period C)"=$\pi/T0sgl=\omega sgl$ can be calculated and stored in memory.

Next, in step S1002, the time required from turning off the motor output signal to stopping the motor is detected. This time corresponds to T2 described in FIGS. 15 and 16.

Figure 15:
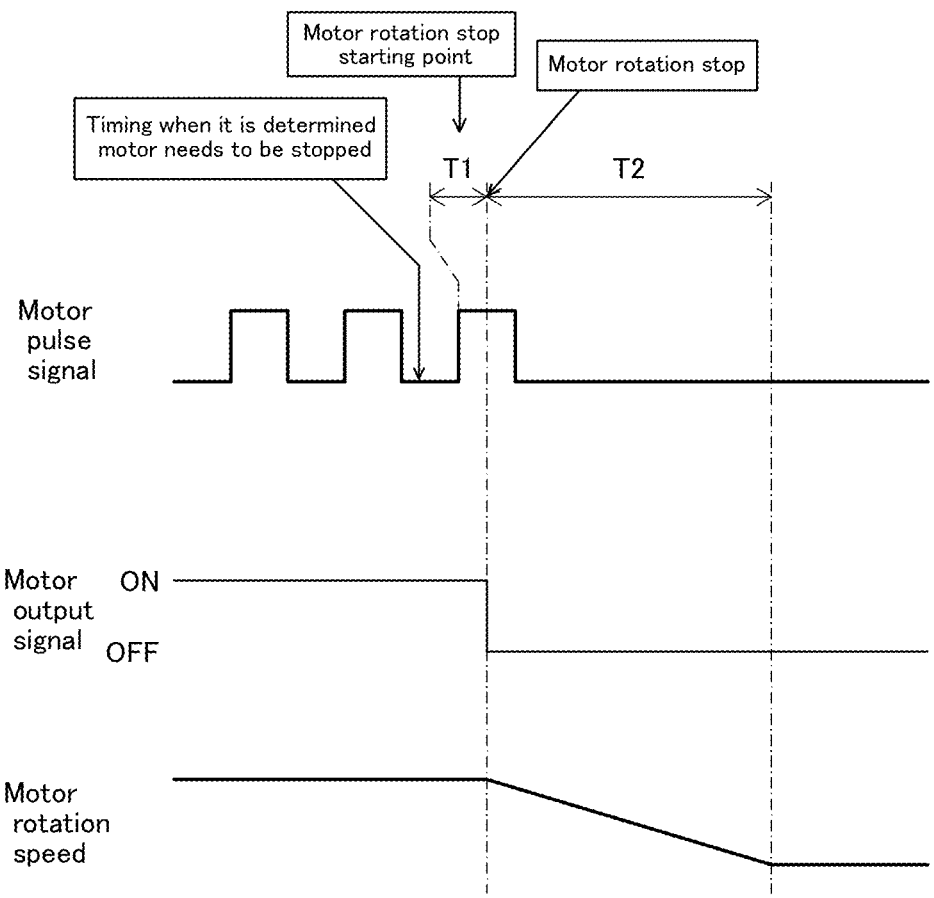
FIG. 15 is a diagram showing a stop position when a pulse edge is used as a motor stop starting point.
Figure 16:
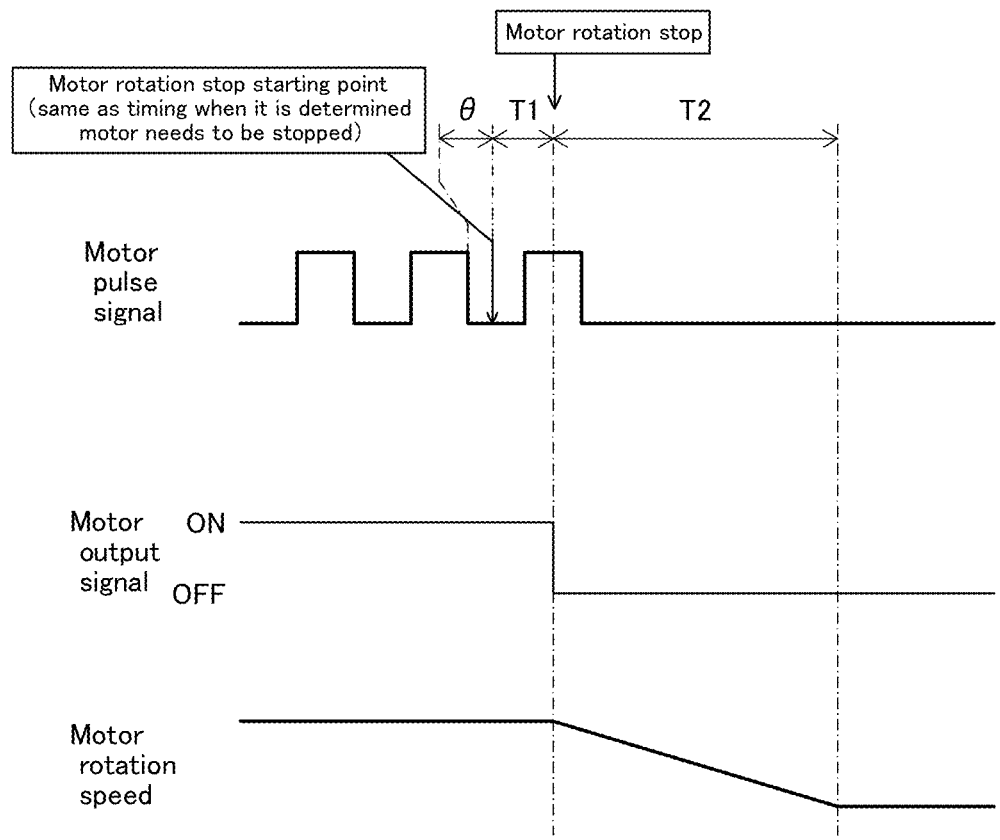
FIG. 16 is a diagram showing a stop position when arbitrary timing is used as a motor stop start point.

FIG. 15 (motor stop starting point 1) is the case where the current rotation angle of the motor is unknown at the timing when it is determined that the motor needs to be stopped. In this case, the timing at which the pulse edge is detected is set as the motor rotation stop starting point. FIG. 16 (motor stop starting point 2) is the case where the current rotation angle θ of the motor is known at the timing when it is determined that the motor needs to be stopped. If the current rotation angle of the motor is known, that time is set as the motor rotation stop starting point. The time T2 learned in the learning mode is corrected in consideration of environmental conditions such as motor rotation speed, temperature, and motor load.

Next, in step S1003, the start point (stop start point) of the timer that measures the timing of turning off the motor output signal is determined.

The stop starting point is the timing at which the measurement of T1 in FIGS. 15 and 16 is started. FIG. 15 shows that when the pulse edge is set as the stop starting point and the motor output signal is turned off after T1 has passed, the motor stops after T2 has passed. That is, the deceleration control is started at a predetermined timing synchronized with the output pulse of the rotation sensor so that the difference between the estimated stop position and the target rotation stop position becomes zero. T1 can be adjusted so that when the motor stops, it stops exactly in the middle between the pulse edges.

Rotation angle at time $T1+T2=\pi+(\frac{1}{2})\times\pi$ should be

If the interval of T1+T2 is large and (n) pulse edges are straddled between T1+T2, Rotation angle at time $T1+T2=n\times\pi+(\frac{1}{2})\times\pi$ should be In FIG. 15, n=1 because it straddles one pulse edge.

FIG. 16 shows a case where SW807 and SW808 are OFF and the timing at which it is determined that the motor needs to be stopped, such as when the target movement position is reached, is set as the stop starting point.

When the motor output signal is turned off after T1 has elapsed from the stop starting point, the motor stops after T2 has elapsed.

T1 should be adjusted so that when the motor stops, it stops exactly in the middle between the pulse edges. Let θ be the motor rotation angle when it is determined that the motor needs to be stopped.

Rotation angle at time $T1+T2=n\times\pi-\theta+(\frac{1}{2})\times\pi$ should be In FIG. 16, n=2 because it straddles two pulse edges.

In this case, it is necessary to recognize θ by always measuring the motor rotation speed while the motor is being driven.

θ can be obtained by calculating the angular velocity from the pulse edge interval and multiplying it by the elapsed time from the pulse edge.

Next, in step S1002, the time required from turning off the motor output signal to stopping the motor is detected. This time corresponds to T2 described in FIGS. 15 and 16. T2 is also the one shown in FIG. 7(C) or FIG. 18, and the one derived from FIG. 9 or FIG. 11 is used.

FIG. 15 (motor stop starting point 1) is the case where the current rotation angle of the motor is unknown at the timing when it is determined that the motor needs to be stopped. In this case, the timing at which the pulse edge is detected is set as the motor rotation stop starting point. FIG. 16 (motor stop starting point 2) is the case where the current rotation angle θ of the motor is known at the timing when it is determined that the motor needs to be stopped. If the current rotation angle of the motor is known, that time is set as the motor rotation stop starting point.

FIG. 15 can be said to be a special case where θ=0 can be confirmed by pulse edge measurement. As long as it is possible to recognize θ, any timing can be used as the stop starting point without being limited to the timings shown in FIGS. 15 and 16.

The rotation angle that rotates in the period of T1 is

T1 time rotation angle=$\omega \times T1 = \pi \times T1/T0$ becomes. For ω, ωavr or ωsgl described above is used.

When obtaining the rotation angle that advances in the period of T2, first, the deceleration angular acceleration a is obtained. Since the angular velocity becomes 0 in the period of T2, $$\omega - \alpha \times T2 = 0$$

holds. For this reason, $$\alpha = \omega/T2 = \Pi/(T0 \times T2)$$

becomes.

Here, the rotation stop position is estimated from the deceleration of the DC motor, and deceleration control is performed to stop the motor at the target rotation angle position.

Therefore, the rotation angle of T2 is $$\omega \times T2 - (1/2)\alpha \times T2 \times T2 = \begin{array}{l}(\Pi/T0) \times T2 - (1/2) \times \\ (\Pi/(T0 \times T2)) \times T2 \times T2\end{array}$$

$$= (1/2) \times \Pi \times (T2/T0)$$

becomes. From now on, the angle that advances in T1+T2 is $$\Pi \times T1/T0 + (1/2) \times \Pi \times (T2/T0)$$

becomes. Since this rotation angle should be n×π−θ+(½)× π, $$\Pi \times T1/T0 + (1/2) \times \Pi \times (T2/T0) = n \times \Pi - \theta + (1/2) \times \Pi$$

holds.

Than this $$T1 = ((n \times \Pi - \theta + (1/2) \times \Pi) \times T0 - (1/2) \times \Pi \times T2)/\Pi$$

$$T1 = (1/2) \times (T0 - T2) \ldots n = 0, \theta = 0$$

to obtain T1.

In the case of the form shown in FIG. 15, T1 may be obtained by substituting θ=0.

Next, in step S1004, the elapsed time of T1 is detected, and the motor output signal is turned OFF to stop the motor.

By implementing the embodiments described so far, the motor can be stopped at the center between the pulse edges.

In the embodiment, an electric power seat is illustrated, but it is also applicable to a vehicle electric tilt, telescopic steering device, rearview mirror, side mirror, etc.

The invention claimed is:

1. A positioning device, comprising:
    an actuator connected to a moving body and composed of a DC motor, a speed reduction mechanism, and a single-phase rotation sensor for detecting an amount of rotational displacement of the speed reduction mechanism; and
    the electronic control device for electrically driving the DC motor;
    wherein
    the electronic control device comprises stop control means for performing deceleration control so as to stop the DC motor, with a target rotation stop position set substantially midway between the rising edge and the falling edge of the output pulse of the rotation sensor; and
    learning control means for learning the target rotation stop position.

2. The positioning device according to claim 1, wherein the stop control means performs deceleration control to decelerate and stop the DC motor in an inertial rotation mode in which power supply to the DC motor is interrupted.

3. The positioning device according to claim 1, wherein the stop control means performs deceleration control to decelerate and stop the DC motor in a braking mode in which power supply terminals of the DC motor are electrically shorted.

4. The positioning device according to claim 1, wherein the stop control means performs deceleration control to decelerate and stop the DC motor in a forced braking mode in which electric power is applied to power supply terminals of the DC motor to provide a rotational force in a direction opposite to the direction in which the DC motor rotates during operation.

5. The positioning device according to claim 1, wherein the learning control means comprising:
    detecting a first timing for generating one of the outputs of the rotation sensor;
    detecting a second timing that is longer than the first timing for generating other output of the rotation sensor;
    if the one of the outputs of the rotation sensor is detected at a third timing between the first timing and the second timing, the third timing is set as a new first timing;
    when the other output of the rotation sensor is detected, the third timing is set as a new second timing;
    at a new third timing between the new first timing or the original first timing and the new second timing or the original second timing, the target rotation stop position is learned by detecting the output of the rotation sensor.

6. The positioning device according to claim 5, wherein the output of the sensor is repeatedly detected at a new third timing between the new first timing or original first timing and the new second timing or original second timing, and learning is performed by detecting a substantially intermediate position between the rising edge and the falling edge of the output pulse.

7. The positioning device according to claim 5, wherein in deceleration control by the forced brake mode,
    determined by a new third timing between the new first timing or original first timing and the new second timing or original second timing; and learning forced brake mode period.

8. The positioning device according to claim 1, wherein the learning control means comprising:
    detecting a first timing for generating one of the outputs of the rotation sensor;
    detecting a second timing that is longer than the first timing for generating other output of the rotation sensor;
    if the one of the outputs of the rotation sensor is detected at a third timing, which is obtained by adding a predetermined amount from the first timing or subtracting a predetermined amount from the second timing, the third timing is as set a new first timing;
    when the other output of the rotation sensor is detected, the third timing is set as a new second timing; and
    the target rotation stop position is learned by detecting the output of the rotation sensor at a new third timing when the predetermined amount is added or subtracted.

9. The positioning device according to claim 8, wherein at a new third timing when the predetermined amount is added or subtracted, the output of the rotation sensor is repeatedly detected, and a substantially intermediate position between the rising edge and the falling edge of the output pulse is detected and learned.

10. The positioning device according to claim 8, wherein in deceleration control by the forced brake mode,
    a forced brake mode period determined by a new third timing obtained by adding or subtracting the predetermined amount is learned.

11. The positioning device according to claim 1, wherein the moving body is an electric power seat for a vehicle.

12. The positioning device according to claim 1, wherein the moving body is an electric tilt/telescopic steering system for a vehicle.

13. A control method for the positioning device according to claim 1.

* * * * *